United States Patent
Shigefuji et al.

(10) Patent No.: US 7,437,210 B1
(45) Date of Patent: Oct. 14, 2008

(54) PUNCHING TOOL PROVIDED WITH A TOOL IDENTIFICATION MEDIUM AND PUNCH PRESS PROVIDED WITH A TOOL IDENTIFICATION MEDIUM READER

(75) Inventors: Takehiko Shigefuji, Kanagawa (JP); Shunsuke Takeuchi, Tokyo (JP); Kazuo Tanabe, Kanagawa (JP)

(73) Assignee: Amada Company, Limited, Kanagawa (JP)

( * ) Notice: Subject to any disclaimer, the term of this patent is extended or adjusted under 35 U.S.C. 154(b) by 667 days.

(21) Appl. No.: 09/680,293

(22) Filed: Oct. 6, 2000

Related U.S. Application Data

(62) Division of application No. 08/887,279, filed on Jul. 2, 1997, now Pat. No. 6,163,734.

(60) Provisional application No. 60/021,903, filed on Jul. 5, 1996.

(51) Int. Cl.
*G06F 15/82* (2006.01)

(52) U.S. Cl. .................. 700/160; 483/9; 83/13

(58) Field of Classification Search ............ 83/698.91, 83/552, 699.41, 588, 140, 635, 640, 684, 83/685; 483/5–9, 28, 29; 700/160, 169, 700/179
See application file for complete search history.

(56) References Cited

U.S. PATENT DOCUMENTS

| | | | |
|---|---|---|---|
| 3,628,231 A | 12/1971 | Pancook | |
| 3,657,627 A | 4/1972 | Inaba et al. | |
| 3,686,992 A | 8/1972 | Daniels | |
| 3,810,299 A * | 5/1974 | Jerue | 29/568 |
| 4,109,188 A | 8/1978 | Shima et al. | |
| 4,257,292 A | 3/1981 | Faull | |
| 4,356,621 A | 11/1982 | Tomita et al. | |
| 4,440,052 A | 4/1984 | Weisbeck | |
| 4,457,196 A | 7/1984 | Cady | |
| 4,533,823 A | 8/1985 | Vittorio | |
| 4,581,810 A * | 4/1986 | Kawakami et al. | 29/568 |

(Continued)

FOREIGN PATENT DOCUMENTS

JP 62120945 6/1987

(Continued)

OTHER PUBLICATIONS

An English Language abstract of JP 63-174733.

(Continued)

*Primary Examiner*—Jason Prone
(74) *Attorney, Agent, or Firm*—Greenblum & Bernstein, P.L.C.

(57) ABSTRACT

A punch press has a punch supporting member (22) for supporting a plurality of punches (26) and a die supporting member (24) for supporting a plurality of dies (28), wherein identification media (34, 36) representing a punch and a die identification information for identifying each tool are attached to each punch and die, respectively. The punch press comprises a punch identification medium reader (38) for reading out a punch identification information from the punch identification medium (34) attached to said punch; a die identification medium reader (40) for reading out a die identification information from the die identification medium (36) attached to said die; and a comparator (68) for comparing a punch identification information from said punch identification medium reader and a die identification information from said die identification medium reader with each other.

5 Claims, 14 Drawing Sheets

U.S. PATENT DOCUMENTS

| | | |
|---|---|---|
| 4,592,146 A | 6/1986 | Campbell |
| 4,620,362 A | 11/1986 | Reynolds |
| 4,631,465 A | 12/1986 | Fukuyama et al. |
| 4,720,907 A | 1/1988 | Rapp |
| 4,856,177 A | 8/1989 | Takeuchi et al. |
| 4,862,782 A | 9/1989 | Ernst |
| 4,900,252 A | 2/1990 | Liefke et al. |
| 4,922,591 A | 5/1990 | Campbell |
| 5,046,014 A | 9/1991 | Anjo |
| 5,133,237 A | 7/1992 | Daffe |
| 5,193,421 A | 3/1993 | Meisinger |
| 5,297,022 A * | 3/1994 | Watanabe ................ 700/86 |
| 5,342,276 A | 8/1994 | Fujiwara et al. |
| 5,595,560 A | 1/1997 | Kamada |
| 5,682,657 A * | 11/1997 | Hirose ........................ 29/33 |
| 5,943,240 A | 8/1999 | Nakamura |
| 5,983,688 A | 11/1999 | Anzai et al. |
| 6,163,734 A * | 12/2000 | Shigefuji et al. ............ 700/160 |
| 7,024,978 B1 * | 4/2006 | Helinski ..................... 83/684 |

FOREIGN PATENT DOCUMENTS

| | | |
|---|---|---|
| JP | 63154228 | 6/1988 |
| JP | 63174733 | 7/1988 |
| JP | 1321149 | 12/1989 |
| JP | 2172646 | 7/1990 |
| JP | 3239451 | 10/1991 |
| JP | 3294029 | 12/1991 |
| JP | 4153377 | 1/1992 |
| JP | 4108931 | 9/1992 |
| JP | 4262826 | 9/1992 |
| JP | 5-9715 | 2/1993 |
| JP | 6292930 | 10/1994 |
| JP | 7164073 | 6/1995 |
| JP | 11028532 A * | 2/1999 |
| JP | 11028533 A * | 2/1999 |
| JP | 11028534 A * | 2/1999 |
| JP | 11028536 A * | 2/1999 |

OTHER PUBLICATIONS

An English Language abstract of JP 4-153377.
An English Language abstract of JP 4-262826.
An English Language abstract of JP 3-239451.
An English Language abstract of JP 3-294029.
An English Language abstract of JP 6-292930.

* cited by examiner

R4 (R8)

R4 (R8)

PUNCHING TOOL PROVIDED WITH A TOOL IDENTIFICATION MEDIUM AND PUNCH PRESS PROVIDED WITH A TOOL IDENTIFICATION MEDIUM READER

CROSS REFERENCE TO RELATED APPLICATION

This application claims the benefit of U.S. Provisional Application No. 60/021,903, filed Jul. 5, 1996, entitled "Punching Tools Equipped With Tool Identification Medium and Punch Press Equipped With Tool Identification Medium Reading Device", the disclosure of which is expressly incorporated herein by reference in its entirety.

This application is a division of U.S. patent application Ser. No. 08/887,279, filed on Jul. 2, 1997, and issued as U.S. Pat. No. 6,163,734, the contents of which are expressly incorporated by reference in its entirety.

BACKGROUND OF THE INVENTION

1. Field of the Invention

The present invention relates to a punching tool provided with a tool identification medium and a punch press provided with a tool identification medium reader.

2. Prior Art

In a punch press for performing punching operation on a sheet workpiece, such as sheet metal, a variety of punches and dies (i.e. tools) are provided in accordance with the shapes of holes to be made in the workpiece. In a turret punch press, these punches and dies are mounted on upper and lower turrets each rotatably supported by a machine frame. The turrets are adapted to be rotated to selectively bring a desired punch-and-die pair to a predetermined working position. In another punch press, a variety of punches and dies are stored in a tool magazine, and a desired punch-and-die pair is selected from the magazine and supplied to a working position of the punch press.

To manage or supervise such a large number of punches and dies, it is disclosed in prior arts to attach tool identification mediums to respective punches and dies and to detect the same identification mediums by a suitable detection device. For example, JP63-174733A discloses a punch press provided with a tool changing device. In the punch press, tool information for distinguishing upper tool and lower tool, and tool-pair information for speciying the upper and lower tools as a upper-and-lower tool pair are stored. Further, in this press, storage positions in the tool magazine where the upper and lower tools are accommodated are stored in the memory while being correlated to the tool-pair information. During the operation of the press, desired upper and lower tools are selected and taken out from the magazine on the basis of such tool-pair information, so that the tools are changed with old tools on the punch press. The tool-pair information includes tool shape information, tool size information and tool clearance information. The tool information includes a tool manufacturing number and a tool manufacturing date. Such information may be represented by bar codes that is provided on the surface of the tools to be read by a bar code scanner.

However, conventional punches and dies have very small area for bearing the identification medium, so that the medium representing complex information cannot be attached to the tools.

Further, the conventional system has the following problem. That is, when tools are stored in the tool magazine or mounted on the turret, potential operator's errors of storing the tools in an erroneous position in the magazine or of mounting tools in an erroneous tool mounting section on the turret so as to face an erroneous direction cannot be detected.

Further, a conventional system includes another problem that when a plurality of punch presses are used, tools on the punch presses cannot be searched because the plurality of the presses are not uniformly managed or supervised therein.

Further, a conventional system has a problem that a control program for a punch press were prepared without taking account of the tools mounted on the turret or stored in the tool magazine, so that working time was wasted for mounting necessary tools before actual punching operation.

SUMMARY OF THE INVENTION

The first feature of the present invention is a punch that is removably mounted on a punch supporting member and performs punching operations in a plate material in cooperation with a die mounted on a die supporting member, said punch comprising:

a punch guide that has a through hole in the longitudinal direction and is mounted on said punch supporting member so as to be slidable in said longitudinal direction, the outside circumferential surface thereof that is in contact with said punch supporting member being chamfered, and a tool identification medium being attached to the said chamfered outside circumferential surface; and a punch body that is slidably inserted into the through hole of said punch guide.

According to this punch, since an identification medium is not rubbed against the inside circumferential surface of a punch set hole of the punch supporting member, the life of the identification medium can be lengthened.

The second feature of the invention is a punch that is removably mounted on a punch supporting member and performs punching operations in a plate material in cooperation with a die mounted on a die supporting member, said punch comprising:

a punch guide that has a through hole in the longitudinal direction and is mounted on said punch supporting member so as to be slidable in said longitudinal direction; and a punch body that is slidably inserted into the through hole of said punch guide, a part of an outside circumferential surface thereof that is in contact with said punch guide being chamfered, and a tool identification medium being attached to said chamfered surface, wherein a through hole is formed in the side surface of said punch guide so that the tool identification medium on said punch body can be checked when the punch body is inserted into said punch guide.

According to this arrangement, a kind of the said punch body can be checked in a state where the punch body is inserted into the punch guide.

The third feature of the invention is a die that is removably mounted on a die supporting member and performs punching operations in a plate material in cooperation with a punch mounted on a punch supporting member, said die having:

a through hole formed in its central part; a chamfered surface formed on an outside circumferential surface that is contact with said die supporting member; and a tool identification medium (36) attached to this chamfered surface.

According to this die, since an identification medium is not rubbed against the inside circumferential surface of a die set hole of the die supporting member, the life of the identification medium can be lengthened.

The fourth feature of the invention is a punch that is removably mounted on a punch supporting member and performs punching operations in a plate material in cooperation with a die mounted on a die supporting member, wherein said punch has a longitudinal axis and is mountable on said punch supporting member at a plurality of angular positions around said longitudinal axis, and angular position identification media for indicating angular positions of the punch in relation to said punch supporting member are attached to the outside circumferential surface of the punch.

According to this arrangement, a fitting angle of the punch on the punch supporting member can be detected by reading said angular position identification medium.

The fifth feature of the invention is a die that is removably mounted on a die supporting member and performs punching operations in a plate material in cooperation with a punch mounted on a punch supporting member, wherein said die has a through hole to engage with a punch body of said punch and is mountable on said die supporting member at a plurality of angular positions around said through hole, and angular position identification media for indicating angular positions of the die in relation to said die supporting member are attached to the outside circumferential surface of the die.

According to this arrangement, a mounting angle of the die on the die supporting member can be detected by reading said angular position identification medium.

The sixth feature of the invention is a punch press having a punch supporting member that is rotatable and supports a plurality of punches and a die supporting member that supports a plurality of dies corresponding to said punches and is rotatable about an axis that is parallel with the axis of rotation of said punch supporting member, wherein a punch angular position identification medium for indicating an angular position of a punch mounted on said punch supporting member is attached to the outside circumferential surface of said punch;

a die angular position identification medium for indicating an angular position of a die mounted on said die supporting member is attached to the outside circumferential surface of said die;

the punch press comprising:

a punch angular position reader for reading out a punch angular position from said punch angular position identification medium;

a die angular position reader for reading out a die angular position from said die angular position identification medium;

an angular position comparator for comparing the punch angular position and the die angular position from the respective readers with each other.

According to this arrangement, it is possible to easily detect difference between a mounting angle of a punch and a fitting angle of a die.

The seventh feature of the invention is a punch press having a punch supporting member for supporting a plurality of punches and a die supporting member for supporting a plurality of dies, wherein identification media representing a punch and a die identification information for identifying each tool are attached to each punch and die, respectively;

the punch press comprising:

a punch identification medium reader for reading out a punch identification information from the punch identification medium attached to said punch;

a die identification medium reader for reading out a die identification information from the die identification medium attached to said die; and a comparator for comparing a punch identification information from said punch identification medium reader and a die identification information from said die identification medium reader with each other.

In this punch press, it is surely detected that a punch on the punch supporting member and a die on the die supporting member do not correspond to each other. It is to be noted that in a prior art reference, Japanese Patent Application Laid-open No. 7-164073, an error can occurs when punches or dies are mounted on a turret after identification media are read.

The eighth feature of the invention is a punch press having a punch supporting member for supporting a plurality of punches and a die supporting member for supporting a plurality of dies, wherein identification media for identifying each tool are attached to each punch and die;

the punch press comprising:

a punch identification medium reader for reading out a punch identification information from the punch identification medium attached to said punch;

a die identification medium reader for reading out a die identification information from the die identification medium attached to said die; and a punch-and-die identification information feedback means for combining a punch identification information from said punch identification medium reader and a die identification information from said die identification medium reader in a pair to prepare a punch-and-die-pair identification information and for feeding the punch-and-die-pair identification information back to an automatically programming apparatus for generating a numerical control program for the punch press.

According to this arrangement, it is possible to prepare an NC program, using only punches and dies actually mounted on the punch press, on the basis of the feedback signal. Therefore it is possible to minimize setup steps for replacement of the tools.

The ninth feature of the invention is a method of preparing a program for a punch press, wherein:

said punch press is provided with a punch supporting member that supports a plurality of punches and a die supporting member that supports a plurality of dies corresponding to said punches;

identification media for identifying each tool are attached respectively on each of said punches and each of said dies;

said punch press is provided with a punch identification medium reader for reading out a punch identification information from a punch identification medium attached to said punch and a die identification medium reader for reading out a die identification information from a die identification medium attached to said die;

wherein said program preparing method prepare said program by feeding a punch identification information and a die identification information from said respective identification medium readers back to a automatically programming apparatus and by allotting a punch existing on said punch supporting member and a die existing on said die supporting member to a processing region on the basis of the feedback signal.

According to this arrangement, it is possible to minimize setup steps for replacement of the tools.

The tenth feature of the invention is a processing program preparing apparatus for a numerically controlled punch press, comprising:

a processing intention data generator for generating, on the basis of product shape data, processing intention data for specifying a processing region to be processed to manufacture a product; and a tool data adding section for adding, to said processing intention data, data for specifying a punch and a die to be used to process said processing region.

According to this arrangement, it is possible to prepare an NC program, using only punches and dies actually mounted on the punch press, on the basis of the feedback signal. Therefore it is possible to minimize setup steps for replacement of the tools.

The eleventh feature of the invention is a punch press system provided with a plurality of punch presses, each punch press of which comprising:

a punch supporting member for supporting a plurality of punches each of which is provided with a punch identification medium;

a die supporting member for supporting a plurality of dies each of which is provided with a die identification medium;

a punch identification medium reader for reading out a punch identification information from the punch identification medium attached to said punch; and a die identification medium reader for reading out a die identification information from the die identification medium attached to said die, wherein said punch identification medium reader and said die identification medium reader of each of said punch presses are connected to a central manager for collectively storing a punch identification information and a die identification information.

According to this system, it is easy to locate where a necessary tool exists when replacing a tool.

DETAILED DESCRIPTION OF THE PREFERRED EMBODIMENTS

Embodiments of the present invention are described in the following by using the accompanying drawings.

Figure 1:
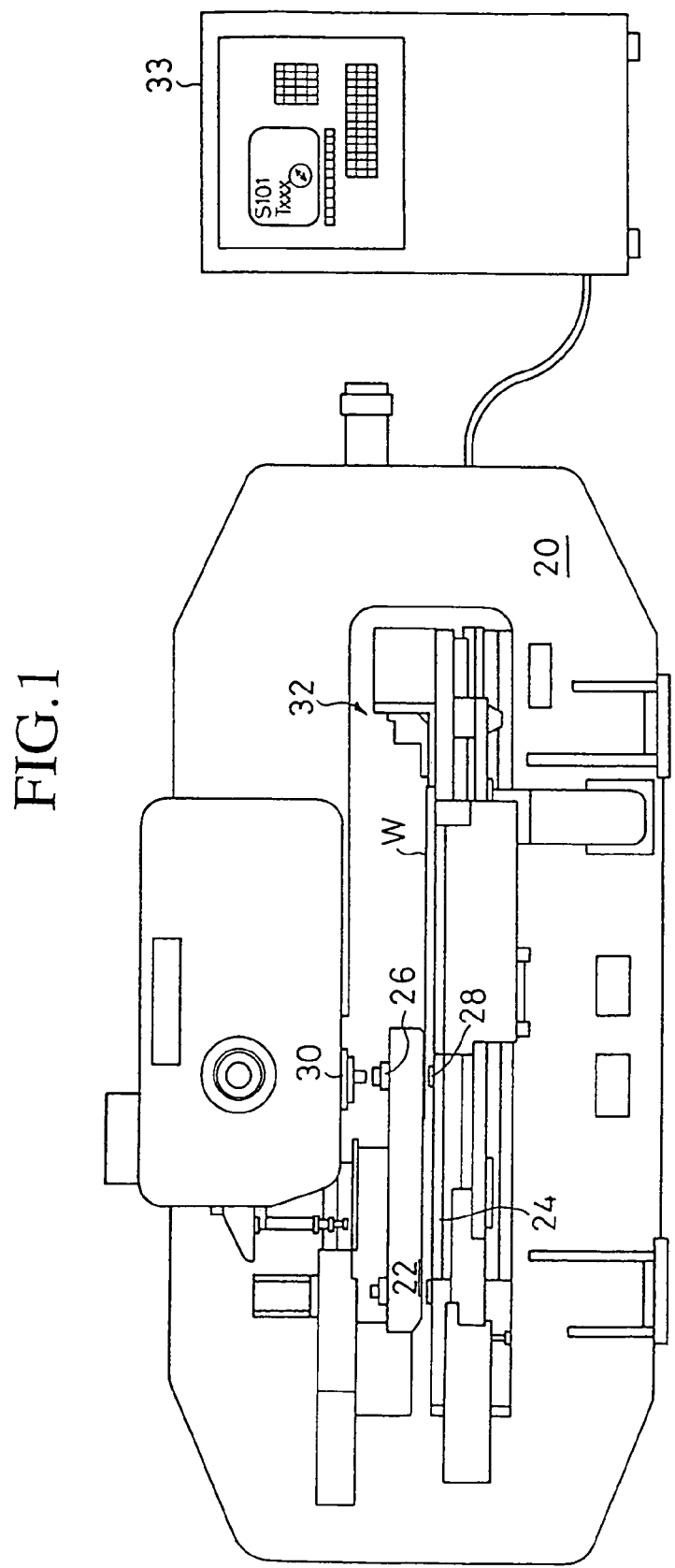
FIG. 1 is a figure for explaining a turret punch press according to an embodiment of the invention.

FIG. 1 is a front view of a turret punch press of the embodiment. As shown in FIG. 1, a disk-shaped upper turret (punch holding member) 22 and a lower turret (die holding member) 24 are mounted on a frame 20 of a turret punch press so as to be rotatable. A number of punches (punch assembly) 26 are mounted on the circumference of the upper turret 22 so as to be vertically movable in relation to the upper turret 22. Similarly, dies 28 corresponding to the punches are mounted on the circumference of the lower turret 24. A striker 30 for striking a punch located at a predetermined position is provided at a predetermined position of the frame 20 so as to be vertically movable. A workpiece positioning device 32 which moves a workpiece (sheet metal) W horizontally and positions it between the punches 26 and the dies 28 is provided. Therefore a desired punching can be performed in a desired portion of a workpiece by the steps as follows: positioning a desired punch 26 and die 28 under the striker 30 by turning properly the turrets 22, 24; positioning a desired portion of the workpiece between the punch and the die by moving properly the workpiece positioning device 32; and striking the punch with the striker 30.

This turret punch press is provided with a punch-press numerical controller 33 for numerically controlling the turret punch press.

Figure 2:
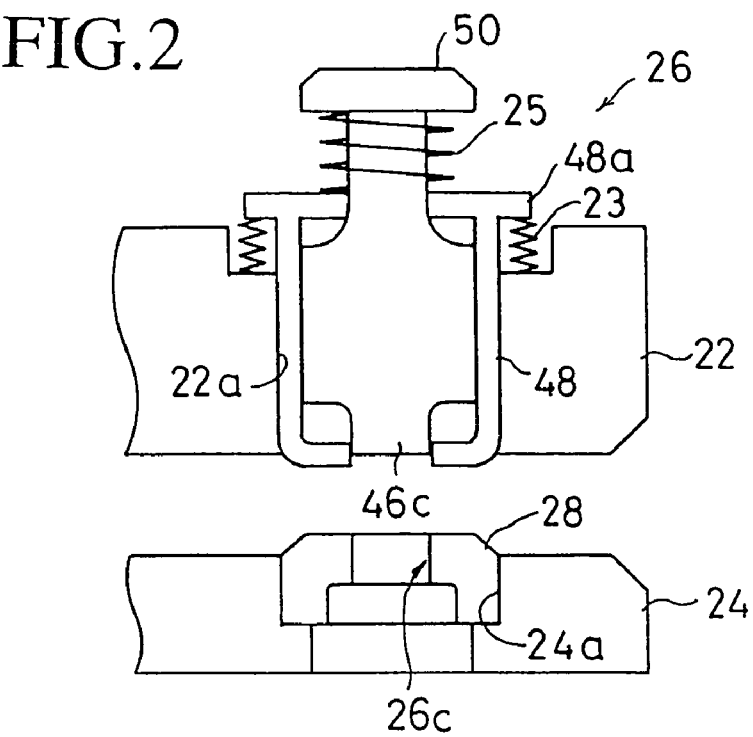
FIG. 2 shows a manner in which punches and dies are mounted on the upper and lower turrets of the turret punch press.

FIG. 2 is a figure for showing in more detail a punch 26 and a die 28, respectively, mounted on the upper turret 22 and the lower turret 24.

A punch guide 48 is fitted in a punch set hole 22a of the upper turret 22 so as to be vertically movable. An outer flange 48a is formed at the upper end of the punch guide and a lifer spring 23 is provided between the outer flange 48a and the upper turret 22. Therefore the whole punch 26 is held at a specified height in relation to the upper turret 22.

A punch body 46 is inserted in the punch guide 48 so as to be vertically movable, and a punch blade 46c is formed at the lower end of the punch body 46.

A punch head 50 is provided on the top of the punch body 46 and a strong stripper spring 25 is provided between the outer flange 48a at the upper end of the punch guide and the punch head 50. After a punching operation, the punch blade is pulled out from the die 28 and the workpiece by the stripper spring 25. Further the die 28 has a punch hole (through hole) 26c to engage with the punch blade 46c and is inserted and set in a die set hole 24a of the lower turret 24.

Figure 3:
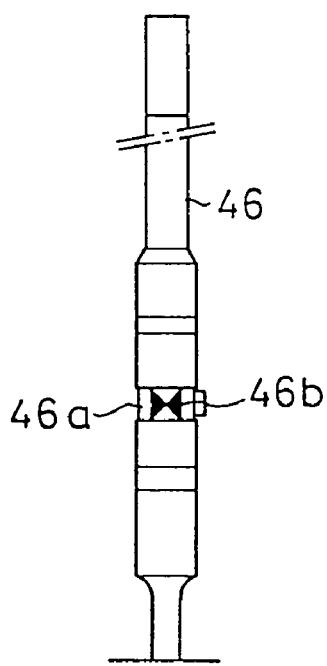
FIGS. 3-9 are figures for explaining manners in which punch identification media and a die identification media are attached to the punch and the die.
Figure 4:
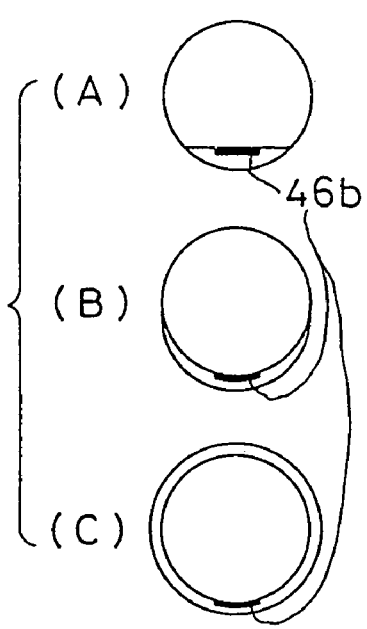

A punch identification medium and a die identification medium for identifying the punch and die from other punches and dies are attached to the punch 26 and the die 28. FIGS. 3 to 9 are explanatory figures for explaining a punch identification medium 34 attached to the punch 26 and a die identification medium 36 attached to the die 28. More specifically, as shown in FIG. 3, a chamfered section 46a is formed on the drum section of the punch body 46 and a punch body identification medium 46b is attached to this chamfered section. This chamfered section may be formed by linear chamfer as shown in FIG. 4A or by a chamfer in the shape of partial circular arc as shown in FIG. 4B or by a chamfer in the shape of full circular arc as shown in FIG. 4C. By attaching the identification medium 46b on a surface chamfered in such a manner, the identification medium 46b is not rubbed against the inside circumferential wall of the punch body 48 or punch set hole 22a of the turret 22, and the life of the identification medium can be lengthen.

Figure 5:
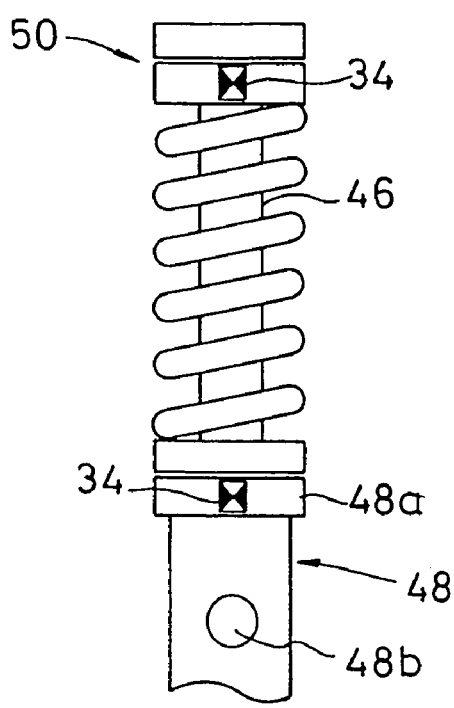
Figure 6:
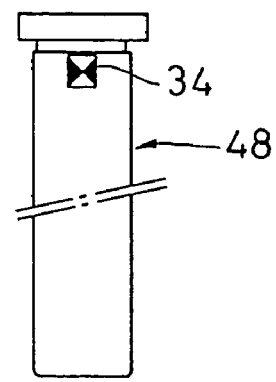
Figure 7:
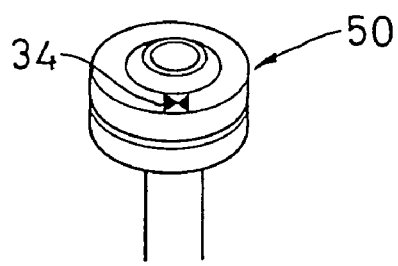

As shown in FIG. 5, the punch identification medium 34 is attached to the upper collar (outer flange) 48a of the punch guide 48. The punch identification medium 34 can be also attached to the side surface of the punch head 50, as shown in FIG. 5. Further the punch identification medium 34 can be also attached to the outside circumferential surface of the punch guide 48, as shown in FIG. 6. When the punch identification medium 34 is attached to the outside circumferential surface, it is desirable to form a chamfered section as shown in FIG. 4 and attach the punch identification medium 34 to the chamfered section. By forming a chamfered section on the outside circumferential surface, a comparatively wide area to attach an identification medium can be secured and thus a comparatively complicated identification medium can be attached thereto. Further the punch identification medium 34 can be also attached to the top of the punch head 50, as shown in FIG. 7.

Furthermore, as shown in FIG. 5, it is desired to form, in the outside circumferential portion of the punch guide 48, a through hole 48b at a position corresponding to the punch body identification medium 46b when the punch body 46 is inserted into the punch guide 48. With this hole, even after the punch body 46 is inserted into the punch guide 48, the punch body identification medium 46b attached to the punch body 46 can be identified from the outside. The following advantages are brought by this arrangement: When a plurality of punch bodies and stripper plates are used for one punch guide, the punch body and the stripper plate is not uniquely determined only from a shape of the punch guide. However, by reading the identification medium 46b of a punch body 46 through the through hole 48b, the punch body and the stripper plate can be identified while the punch body is inserted into the punch guide.

Figure 8:
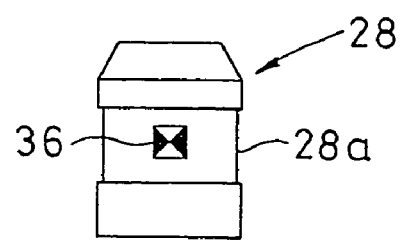
Figure 9:
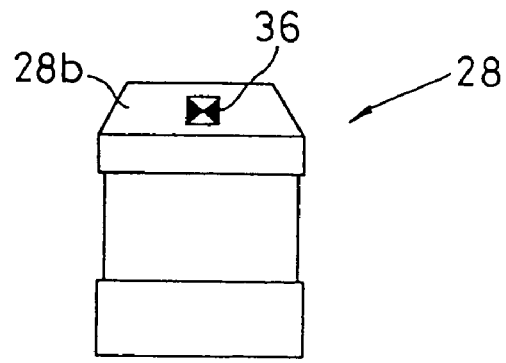

FIGS. 8 and 9 show manners in which a die identification medium is attached to the die 28. In a manner shown in FIG. 8, a chamfered section 28a is formed on the outside circumferential surface of the die 28, and a die identification medium 36 is attached to the chamfered section 28a. In a manner shown in FIG. 9, a die identification medium 36 is attached to a tapered section 28b of the upper end of the die 28.

The punch identification medium 34 and the die identification medium 36 are composed of, for example, a bar code, a two-dimensional code (VERI code, PDF417 code, or QR code), an ID tag, an IC chip, and a marker.

In case that the identification media 34 and 36 are a bar code, an infrared apparatus or a laser apparatus is desirable as a means for reading the identification medium but a camera or the like will do.

When the punch 26 and the die 28 is set in specified set holes 22a and 24a of the turrets 22 and 24, the punch 26 is first set on the upper turret 22 after a punch identification medium 34 is read, for example, by means of a suitable portable reading means (not shown). Then an identification medium of the die 28 is read. At this time, if the die identification medium 36 does not coincide or match with a punch identification information from the punch identification medium 34, an error signal is outputted. If the punch identification information from the punch identification medium 34 and the die identification information from the die identification medium 36 coincide or match with each other, position information (station information) of the set holes 22a and 24a on the turrets and an punch identification information and a die identification information are stored together in a memory of the punch-press numerical controller as a set of data.

Further when a plurality of punch bodies and stripper plates are used alternately for one punch guide, it is possible to read an identification medium on the punch guide 48 and an identification medium on the punch body 46 and store them as a set of data in the numerical controller. Therefore the punch body of a punch to be used can be searched from the data of the punch guide.

Figure 10:
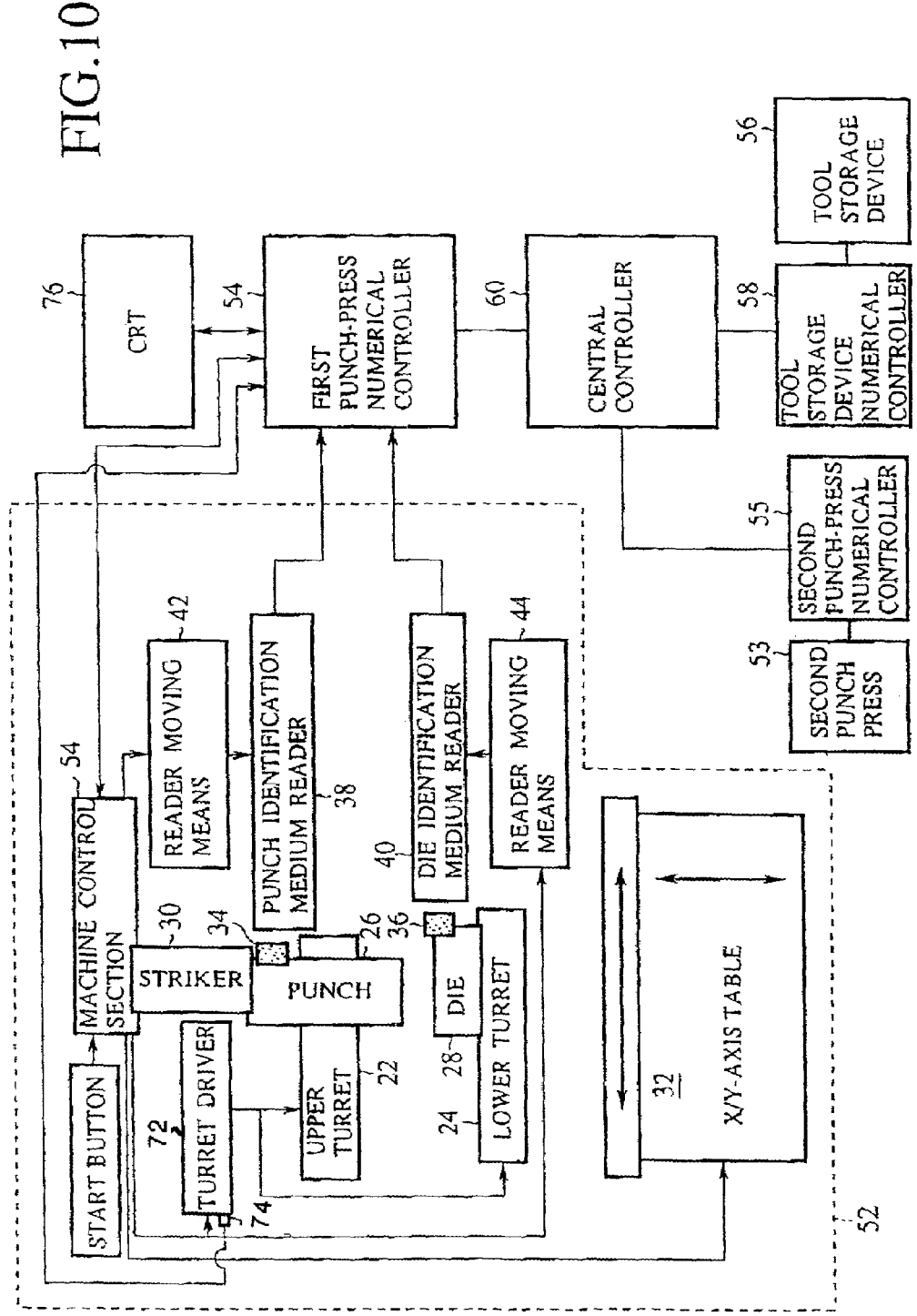
FIG. 10 is a block diagram of a turret punch press system.
Figure 11:
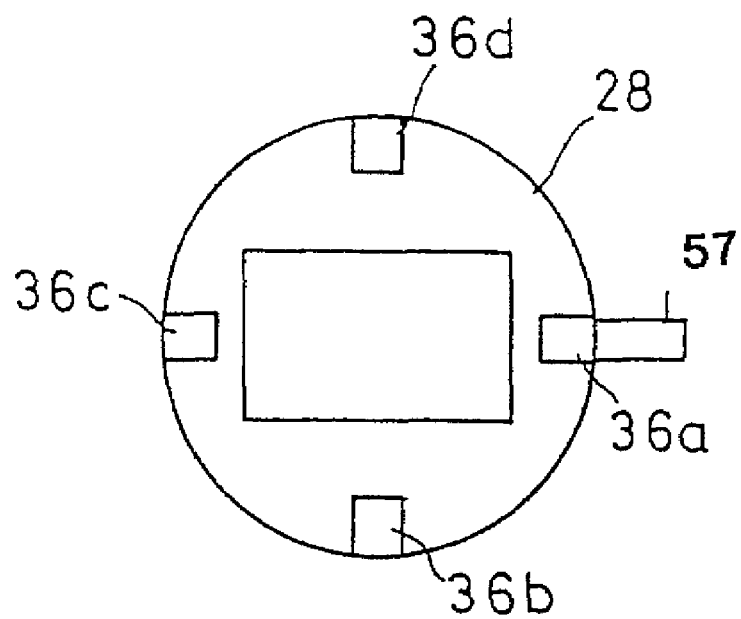
FIG. 11 is a schematic drawing showing a manner in which identification media are attached to four locations on the outside circumferential surface of a punch or a die.

FIG. 10 is a block diagram of a turret punch press system. This system is provided with a first and a second turret punch press 52 and 53 each of which is provided with tool identification medium readers, a first and a second punch press numerical controller 54 and 55 for numerically controlling the presses, a tool storage device 56, a tool-storage-device numerical controller 58, and a central controller 60 for controlling collectively the turret punch presses and the tool storage device. Since the first and the second turret punch presses 52 and 53, and the first and the second punch-press numerical controllers 54 and 55 have the same arrangement, only the first punch press and the first punch-press numerical controller are described in the following.

As shown in FIG. 10, the punch press 52 is provided with an upper turret 22 and a lower turret 24 so as to be rotatable in the same way as the turret punch press in FIG. 1. Mounted on the upper turret 22 and the lower turret 24 are punches 26 and dies 28, respectively. A punch identification medium 34 and a die identification medium 36 for identifying the punch and the die are attached, respectively, to each of the punches 26 and each of the dies 28 (see FIGS. 3 to 9). The punch identification medium 34 and the die identification medium 36 are attached at four locations at equal intervals on the outside circumferential surfaces of the punch 26 and the die 28, respectively (only one place out of the four is illustrated). Further, in FIG. 10, the identification medium 34 of the punch 26 is attached to the punch head 50 as shown in FIG. 5, and the identification medium 36 of the die 28 is attached to the die tapered section 28b as shown in FIG. 9.

A punch identification information contained in the punch identification medium 34 includes the following:
 1. Range (tool diameter or punch guide diameter),
 2. Shape (circle, square, oval, rectangle, double D, single D, center punch, burring, triangle, special shape, tapping, molding, marking, corner radius, rectangle with rounded corner, or the like),
 3. Shape sub-code (for triangle: equilateral triangle, right-angled triangle, or the like; for rectangle: slotting or regular),
 4. Type (whether or not an air blowing function (see Japanese Utility Model Application Laid-Open Publication No. 4-15377) is provided, or the like),
 5. Dimensions (X-dimension, Y-dimension, and R-dimension),
 6. Mounting angle (showing an angle in mounting),
 7. Identification number (identification number of each punch).

A die identification information contained in the die identification medium 36 includes the following:
 1. Range (hole diameter and die outside diameter),
 2. Shape (circle, square, oval, rectangle, double D, single D, center punch, burring, triangle, special shape, tapping, molding, marking, corner radius, rectangle with rounded corner, or the like),
 3. Shape sub-code (for triangle: equilateral triangle, right-angled triangle, or the like; for rectangle: slotting or regular),
 4. Type (whether or not the air blowing function is provided, etc.),
 5. Dimensions (X-dimension, Y-dimension, and R-dimension),
 6. Mounting angle (showing an angle in mounting),
 7. Identification number (identification number of each punch).

Among the identification information, the "angle" has a different value for each position set on the outside circumferential surface of the punch 26 and the die 28. For example, in case of the die identification medium, four identification media 36a, 36b, 36c, and 36d are attached as shown in FIG.

11, and the angles of the respective identification media are set as 0°, 90°, 180°, and 270° from a key 57 of the die 28 as a reference.

In this specification, the punch and the die may be called generally as a "tool", and the punch identification medium 34 and the die identification medium 36 may be called generally as a "tool identification medium."

A punch identification medium reader 38 for reading out a punch identification information from the punch identification medium 34 and a die identification medium reader 40 for reading out a die identification information from the die identification medium 36 are provided at the side of the upper turret 22 and the lower turret 24 of the turret punch press (in case that the identification media 34 and 36 particularly contain an angular position information of a punch mounting angle and a die mounting angle, the identification media are called, respectively, a punch angular position identification medium and a die angular position identification medium, and the respective readers are called, respectively, a punch angular position identification medium reader and a die angular position identification medium reader). The readers 38 and 40 can read, respectively, a tool identification information of every punch 26 and die 28 on the turrets by rotating the upper turret 22 and lower turret 24.

Figure 12:
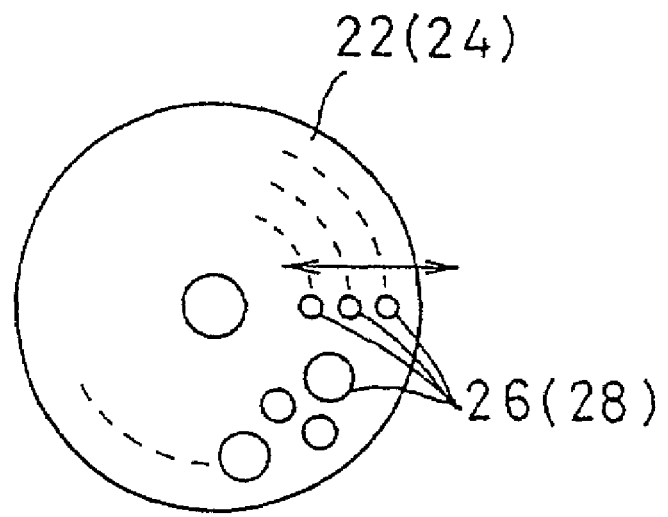
FIG. 12 is a schematic drawing showing a manner in which the punches or dies are mounted on a turret along three tracks.

The readers 38 and 40 are adapted to be movable in a radial direction of the turrets 22 and 24. And the readers 38 and 40 are provided, respectively, with reader moving means 42 and 44 in order to move the readers in the radial direction. Therefore even when punches 22 (or dies 24) are mounted on three tracks on the turret 22 (or 24), for example, as shown in FIG. 12, these readers can easily move close to a tool identification medium of the punch 26 (or die 28) located at the inner side of the turret to read its tool identification information. The reader moving means 42 and 44 move the readers 38 and 40 on the basis of signals from the machine controller 54. The reader moving means 42 and 44 that move the readers 38 and 40 may be implemented through any suitable combination of conventional moving mechanisms or equipment, including servo or electric motors, racks, gear drive trains, rollers, etc.

Figure 13:
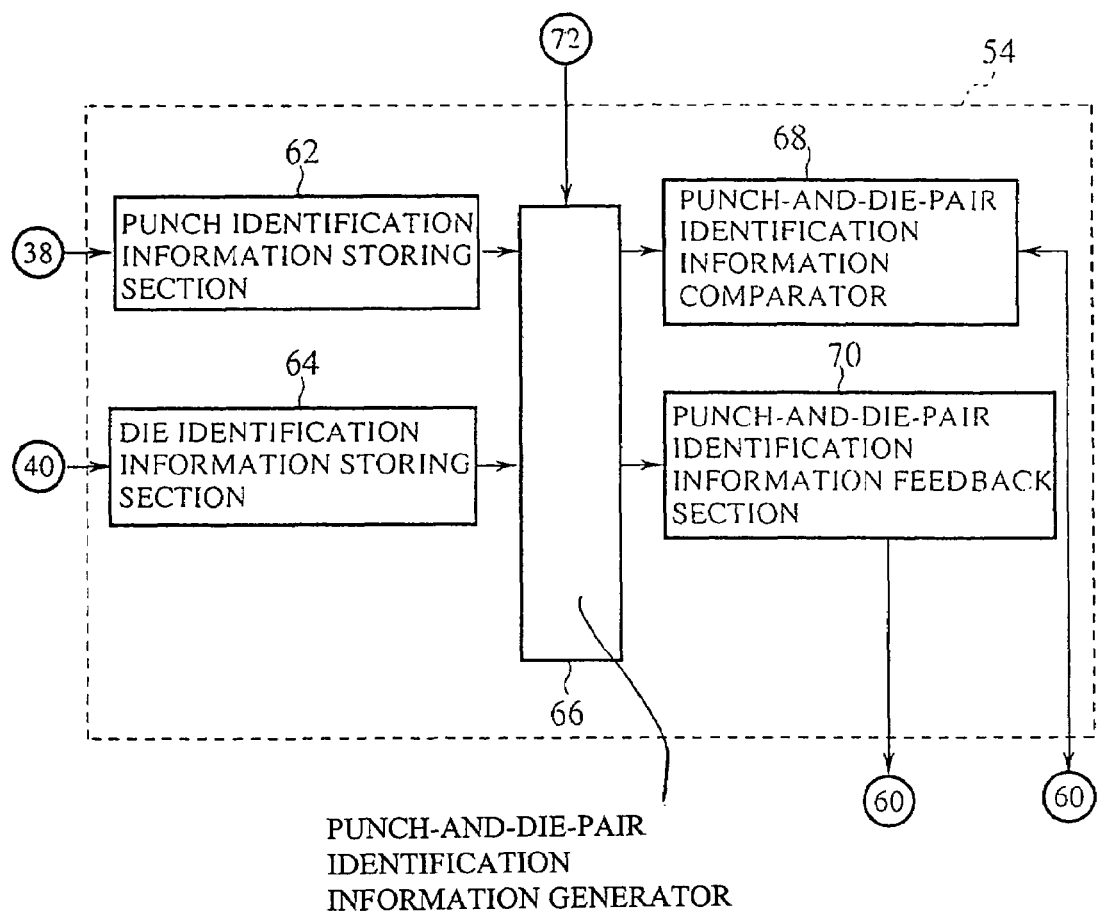
FIG. 13 is a detailed block diagram of a punch-press numerical controller.

As shown in FIG. 13, the first punch-press numerical controller 54 is provided with a punch identification information storing section 62, a die identification information storing section 64, a punch-and-die-pair identification information generating section 66, a punch-and-die-pair identification information comparator 68, and a punch-and-die-pair identification information feedback section 70.

According to the above-mentioned arrangement, a punch identification information and a die identification information from the punch identification medium reader 38 and a die identification medium reader 40 are supplied to the punch-and-die-pair identification information generator 66 through the punch identification information storing section 62 and the die identification information storing section 64.

Inputted into the punch-and-die-pair identification information generator 66 is a turret turning position information from an encoder 74 provided on a turret driver 72 of the first turret punch press 52 in addition to the punch identification information and the die identification information. Therefore the generator 66 allots the punch identification information and the die identification information to each tool mounting position (tool station) on each turret on the basis of these information, and generates a punch-and-die-pair identification information as shown in the following Table 1.

TABLE 1

| Tool mounting position | Punch | | | Die | | |
|---|---|---|---|---|---|---|
| | Shape | Size | Mounting angle | Shape | Size | Mounting angle |
| 101 | SH1 | SZ1 | A1 | SH1 | SZ1 | A1 |
| 102 | SH2 | SZ2 | A2 | SH2 | SZ2 | A2 |
| ... | ... | ... | ... | ... | ... | ... |

The punch-and-die-pair identification information generator 66 computes a clearance value corresponding to a difference between a size of the lower end of a punch and a size of a die hole on the basis of a punch identification information and a die identification information. Therefore, although not shown in the above table, the punch-and-die-pair identification information also includes such a clearance value for each tool mounting position.

The generator 66 can also store its generated information and is called a punch-and-die-pair identification information storing means.

The punch-and-die-pair identification information comparator 68 is supplied with the punch-and-die-pair identification information from the punch-and-die-pair identification information generator 66 as well as with a numerical control (NC) program from the central controller 60. The NC program has a content as shown in Table 2.

TABLE 2

| An example of NC programs |
|---|
| (UT/T101, SH1, SZ1, CL=0.2, A=0°) |
| (UT/T102, SH4, SZ4, CL=0.2, A=45°) |
| ... |
| G92 X=..., Y=...; |
| X=..., Y=..., T115; |
| X=..., Y=..., T110; |
| ... |
| G50 |

Here, the lines shown by the UT/T101, UT/T102, and the like represent a list of tools used in this NC program, and the lines shown by G92, G50, and the like represent a processing program. More specifically, in the lines representing the tool list, UT/T101 and UT/T102 represent that the upper tools (namely, punches) have their mounting positions of T101 and T102, and SH1 and SH4 represent that the tools in the mounting positions have shapes of SH1 and SH4, and SZ1 and SZ4 represent that the tools have sizes of SZ1 and SZ4, and CL=0.2 and CL=0.2 represent that the punch and the die have a clearance of 0.2, and A=0° and A=45° represent that the tools have respectively mounting angles of 0° and 45°. The dies to be used are represented by the shapes, sizes and mounting angles of the punches, and clearances between the dies and the punches.

That is, the NC program includes the list of tools to be used in this processing together with the processing program. Therefore the punch-and-die-pair identification information comparator 68 compares the punch identification information and die identification information from the punch-and-die-pair identification information generator 66 with each other and compares these information with a tool information contained in the NC program. For example, for each tool mounting position T, the comparator 68 compares a shape data in the punch identification information, a shape data in the die identification information and a tool shape data in the NC program with one another and then judges whether or not all of the three datum coincide with one another. And the comparator 68 performs such a comparison one after another in relation to all of the seven features (range, shape, shape-sub-code, type, size, mounting angle, and identification number). In case that discordance is detected during the comparison, the discordance is displayed on a CRT display 76 provided in the numerical controller 54.

In case that these three data coincide with one another in relation to all the seven features, the comparator 68 further compares a clearance value in the punch-and-die-pair identification information and a clearance value in the NC program with each other. If the clearance values do not coincide with each other, the discordance is displayed on the CRT in the same manner as described above. Coincidence of the clearance values can be judged also by the following condition equation. Supposing that a punch size (size of the blade of the lower end of a punch) is Xp and a die size (size of the hole of a die) is Xd in a punch-and-die-pair identification information, and a clearance value in the NC program is c, and a tolerance is δ, when the Xp and Xd satisfy the equation, $$Xp+c-\delta \leq Xd \leq Xp+c+\delta,$$

the clearance value in the punch-and-die-pair identification information and the clearance value in the NC program coincide with each other.

The comparator 68 is called an angular position comparator especially when it compares mounting angles of a punch and a die with each other.

The punch-and-die-pair identification information feedback section 70 feeds back the punch-and-die-pair identification information generated by the punch-and-die-pair identification information generator 66 to the central controller 60. More specifically the punch-and-die-pair identification information is fed back to an automatic program generator and a central manager provided in the central controller 60, as described later. Here, it is possible to provide, between the punch-and-die-pair identification information generator 66 and the punch-and-die-pair identification information feedback section 70, a punch and die identification information comparator that compares a punch identification information and a die identification information included in a punch-and-die-pair identification information from the punch-and-die-pair identification information generator 66 with each other to determine whether they coincide with each other. In case that there is discordance, that result is displayed on the CRT 76.

Figure 14:
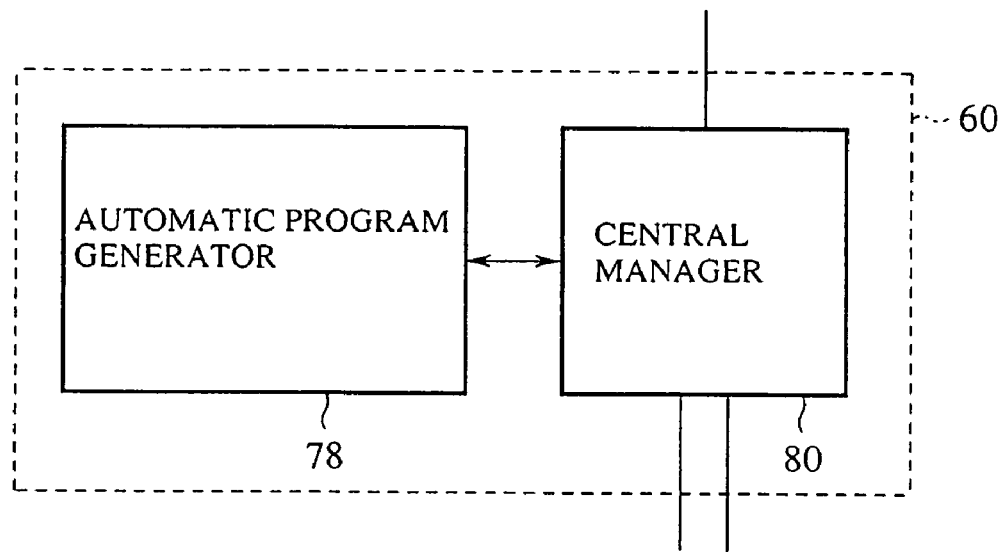
FIG. 14 is a detailed block diagram of a central controller.

FIG. 14 is a block diagram showing a configuration of the central controller 60. The central controller is provided with an automatic program generator (automatically programming apparatus) 78 and a central manager 80.

Figure 15:
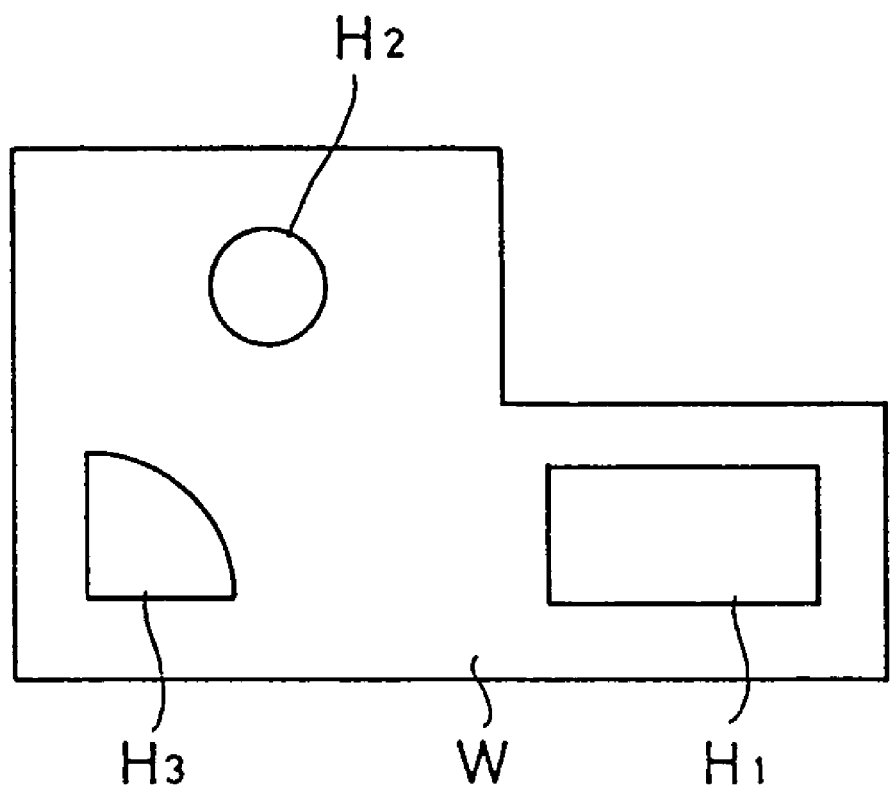
FIG. 15 is a schematic drawing of an example of products.

The automatic program generator 78 receives a punch-and-die-pair identification information from the punch-and-die-pair identification information feedback section 70. And it recognizes tools (a punch and a die) mounted on the turrets 22 and 24 of the turret punch press 52 on the basis of the punch-and-die-pair identification information, and generates an NC program using the tools mounted on the turrets 22 and 24 as much as possible. For example, in case of manufacturing a product W shown in FIG. 15, let us consider a process of punching a hole H1 of 30×20 (dimensional unit is "mm", and hereinafter is the same). This punching process is performed usually by a continuously progressing punching process (nibbling process) using a punch having a blade of rectangle with smaller sides than this hole and a die having a die hole corresponding to this blade, and an automatically programming apparatus of the prior art has selected a punch having a blade of rectangle having sides as large as possible and a die having a die hole corresponding to this blade from a demand for shortening a tact time and improving a finished surface in flatness. In this case, however, when the selected punch and die are not mounted on the turrets 22 and 24, a loss time in the process occurs due to a setup operation of replacing tools. Therefore, to prepare a program for punching the hole H1, the automatic program generator in accordance with this invention selects a punch and a die that have been already mounted on the turrets 22 and 24 even at some cost of a tact time, flatness of a finished surface, and the like. For example, when a tool of 10×10 square and a tool of 15×15 square are considered as a tool for making the hole H1 and when the former is mounted on the turret and the latter is not mounted on the turret, the tool of 10×10 square is selected even if the tool of 15×15 square is desirable from the viewpoint of tact time and flatness of the finished surface.

Likewise, in order to punch holes H2 and H3, tools (punches and dies) that are mounted on the turrets 22 and 24 are selected.

The central manager 80 controls collectively the first punch-press numerical controller 54 for controlling the first turret punch press 52, the second punch-press numerical controller 55 for controlling the second turret punch press 53 and the tool-storage-device numerical controller 58 for controlling the tool storage device 56.

The central manager 80 receives a punch-and-die-pair identification information from the punch-and-die-pair identification information feedback section 70, as describe above, and stores it in its storage section. Incidentally, the feedback section 70 as described above is provided also in the second punch-press numerical controller 55 and the tool storage device numerical controller 58. Therefore the central manager 80 can manage locations of tools mounted on or stored in all of the first turret punch press 52, the second turret punch press 53, and the tool storage device 56 by receiving and storing a punch-and-die-pair identification information from each feedback section 70. The managing information is supplied to the automatically programming apparatus 78. When preparing an NC program for the first punch press 52, if a tool that is not mounted on the punch press 52 is inevitably to be used, the automatically programming apparatus 78 displays on a CRT or the like a station of the second punch press on which the replacing tool is mounted, or a storage location of the tool storage device in which the replacing tool is stored.

Figure 16:
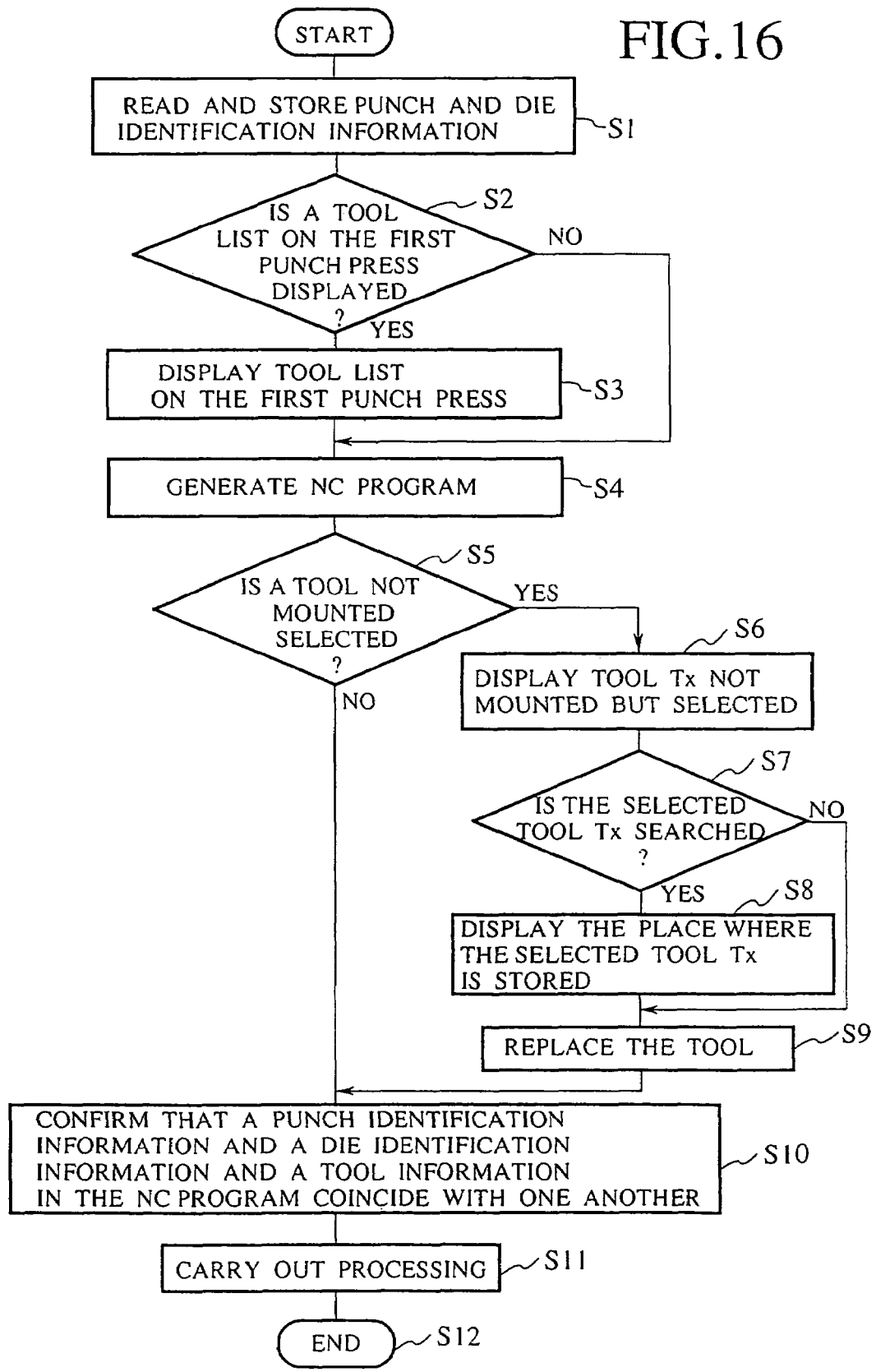
FIG. 16 is a flowchart showing the operation of the system shown in FIG. 10.

FIG. 16 is a flowchart for explaining the overall operation of the turret punch press system. With reference to FIG. 16, in step S1, identification media attached to all punches and dies mounted on the first and second turret punch presses 52 and 53 are read by the reading means 38 and 40, and identification media attached to all punches and dies stored in the tool storage device 56 are read by an apparatus similar to the reading means 38 and 40, and then every punch and die identification information is stored in a storage section in the central manager 80. Incidentally, in step S1, a die body identification medium 46b attached to the die body shown in FIG. 3 can also be read. In this case, it is desirable to read the identification medium 46b, for example, by means of a portable reading means, which is not illustrated.

In step S2, it is determined whether or not to display a list of tools (punches and dies) mounted on the first turret punch press on the CRT screen of the automatically programming apparatus 78. If it is displayed, the system goes to step S3 and displays the tool list on the CRT screen. After finishing displaying the tool list, the system goes to step S4. If it is determined not to display the tool list in step S2, the system directly goes to step S4.

In step S4, the automatically programming apparatus 78 prepares an NC program for the first turret punch press, for example. Here, when a tool list has been displayed in the step S3, the system prepares the NC program while referring to the displayed tool list. In this case, it prepares the NC program by selecting tools mounted on the first turret punch press 52 as much as possible. Thus, it is possible to minimize man-hours for replacement of tools after preparing the NC program. When the tool list is not been displayed, the NC program is prepared independently from tools mounted on the first turret punch press.

In step S5, it is determined whether or not at least one punch or die not mounted on the first turret punch press was used in preparing the NC program in the step S4, and in case of "Yes", the system goes to step S6. In step S6, the system displays a tool identification information of a tool Tx that is selected in preparing the NC program but is not mounted on the first turret punch press.

In step S7, it is determined whether or not to search the tool Tx, and in case of "Yes", the system goes to step S8. In step S8, the system search the location where the tool Tx is mounted or stored on the basis of the punch and die identification information stored in the step S1 and displays a result of this search on a screen of a CRT and the like.

In step S9, the tool Tx is taken out from the mounting or storing location and is mounted on the turrets 22 and 24 of the first turret punch press, and then the system goes to step S10.

If the tool Tx is not searched in step S7, the system goes to step S9, where the tool Tx is taken out from a specified mounting or storing location on the basis of memory of an operator and the like and is mounted on the turrets 22 and 24. Then the system goes to step S10.

In case of "No" in the step S5, the system directly goes to S10.

In step S10, it is checked at the punch-and-die-pair identification information comparator 68 of the first punch-press numerical controller 54 on the basis of the NC program whether or not a punch and die identification information on the first turret punch press 52 and a tool information on the NC program coincide with each other. This check is particularly important in case of preparing the NC program by using tools not mounted on the turret punch press 52. The reason is that in this case a tool replacement is manually carried out in step S9, and therefore there is a chance that a wrong tool (punch and die) is mounted on the turrets 22 and 24 in this tool replacement. If it is confirmed that a punch and die identification information on the punch press 52 and a tool information on the NC program coincide with each other in step S10, the system performs the punching process by means of the first turret punch press 52 in step S11, and then finishes the overall operation in step S12.

Figure 17:
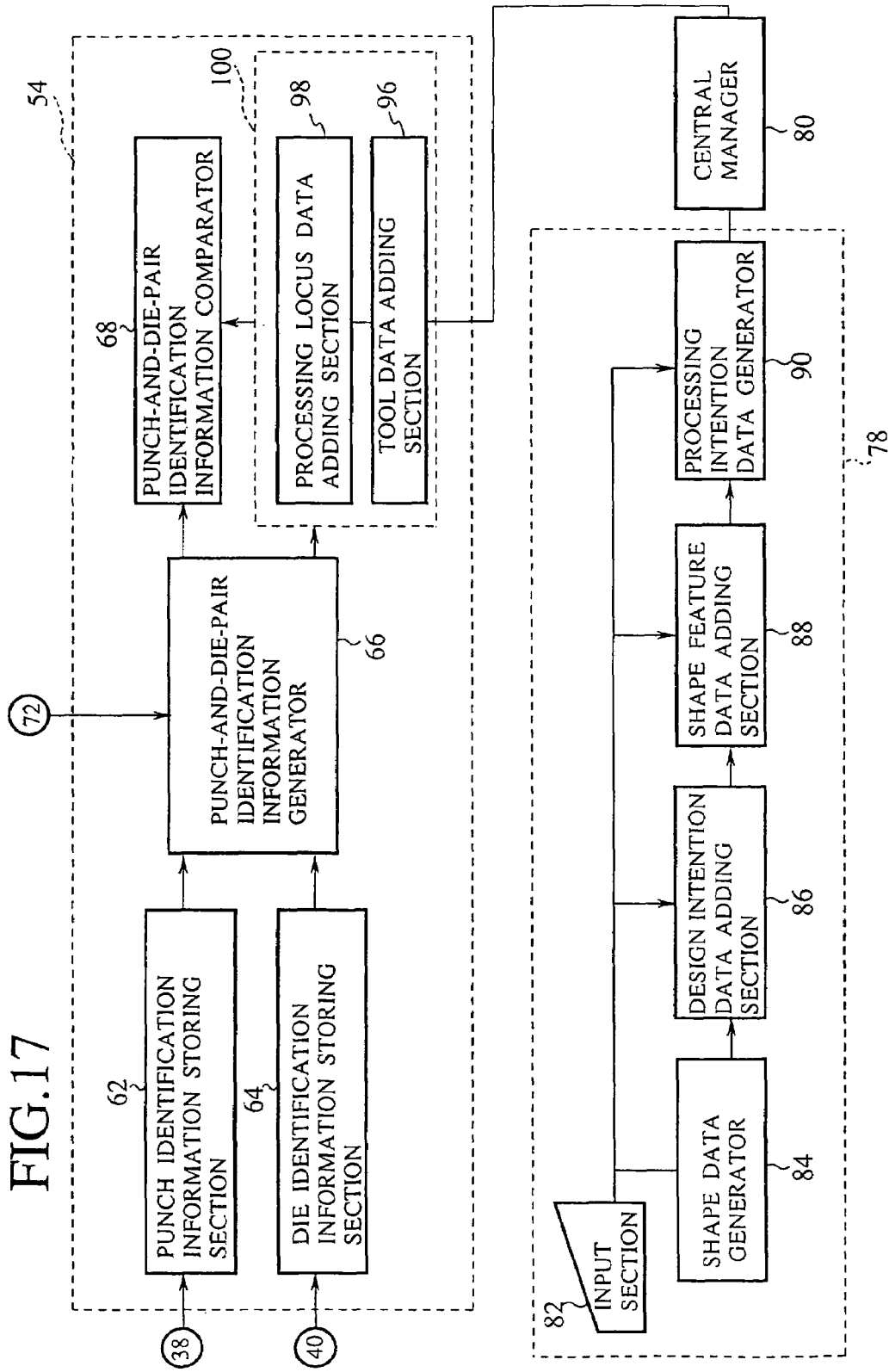
FIG. 17 is a detailed block diagram of a second embodiment of a punch-press numerical controller and a central controller of the punch press system shown in FIG. 10.

FIG. 17 is a block diagram of a second embodiment of the first punch-press numerical controller 54 and the central controller 60 in FIG. 10. The first punch-press numerical controller 54 and the central controller 60 of this embodiment includes a processing intention data generator for generating processing intention data for determining on the basis of shape data of a product an area to be processed in a workpiece and a tool selector for selecting a tool for processing the processing area on the basis of the processing intention data.

More specifically the automatically programming apparatus 78 is provided with an input section 82, a shape data generator 84, a design intention data adding section 86, a shape feature data adding section 88, and a processing intention data generator 90.

Figure 18:
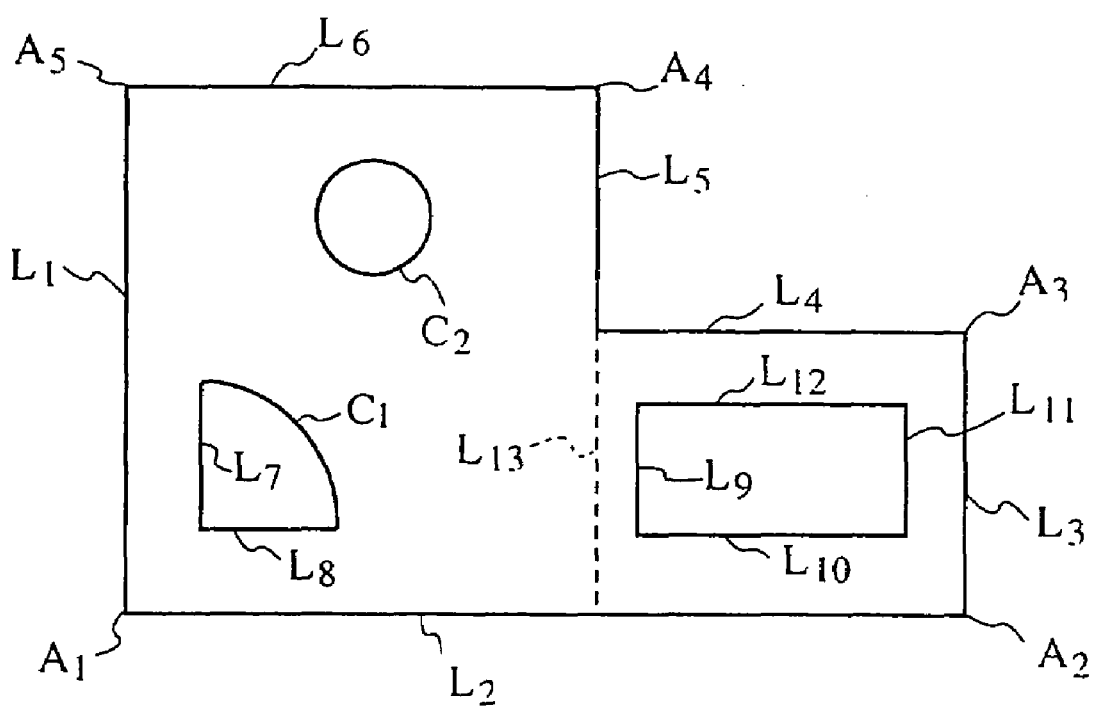
FIGS. 18, 19, 20a, and 20b are explanatory drawings for explaining the operation of the respective parts of the apparatus shown in FIG. 17.

The shape data generator 84 generates shape data of a product on the basis of an image data inputted through the input section 82. These shape data are simply a set of geometrical elements (point, line, circle, arc, and the like). In case of a product shown in FIG. 15, for example, the shape data are composed of data of lines L1 to L13, data of arc C1, and data of circle C2, as shown in FIG. 18. In this case, for example, data of a line is composed of coordinates (x1,y1) and (x2,y2) of both end points of the line, and data of an arc is composed of coordinates (x0,y0) of its center, a radius R, and a beginning angle θ 1 and an ending angle θ 2 of the arc.

In the design intention data adding section 86, when shape data are inputted from the shape data generator 84, design intention data are added to the shape data by operation of an operator. The design intention data are data for expressing what intention of a designer is contained in the respective geometrical elements when it is taken into account that the shape data is a metal-plate design drawing. In case of a product shown in FIGS. 15 and 18, for example, the design intention data are composed of the following data, namely, 1. Data expressing that a loop composed of lines L1 to L6 defines the external shape;
2. Data expressing that a loop composed of lines L9 to L12 defines a regularly-shaped hole;
3. Data expressing that a circle C2 defines a regularly-shaped hole;
4. Data expressing that a loop composed of lines L7 and L8 and an arc C1 defines an irregularly-shaped hole; and
5. Data expressing that a line L13 defines a bending line.

The data of the items 1 to 5 are prepared by an operator inputting the meaning of each of the loops and the lines through the input section 82 but can also be generated automatically.

In the shape-feature-data adding section 88, when data are inputted from the design intention adding section 86, shape-feature-data are further added on the basis of those data by operation of the operator. These shape-feature-data are data for expressing a feature of the shape from a viewpoint of actually performing punching operations. In case of an example in FIG. 18, the shape-feature-data are composed of the following data, namely, 1. Data expressing that the outside of the lines L1, L2, L3, and L6 are to be linearly punched;
2. Data expressing that joints are to be formed at a corner A1 by the lines L1 and L2, a corner A2 by the lines L2 and L3, a corner A3 by the lines L3 and L4, a corner A4 by the lines L4 and L5, and a corner A5 by the lines L5 and L6 (where the joint is a residual section that is left at the corner to join a product to a base material when the workpiece is punched and cut out while leaving only the corner section uncut in view of the fact that if the outside of the external loop composed of the lines L1 to L6 is completely punched off, the product is separated from the base material and it is difficult to take out the product from the turret punch press);
3. Data expressing that the inside of the loop composed of the lines L9 to L12 are to be processed in a rectangular hole;
4. Data expressing that the inside of the circle C2 processed in a round hole; and
5. Data expressing that the inside of the lines L7 and L8 and the arc C1 is processed in irregularly-shaped hole.

The data of the items 1 to 5 are also prepared by an operator who inputs the features related to the section through the input section 82 each time the operator designates the respective section; however, they can also be generated automatically.

Figure 19:
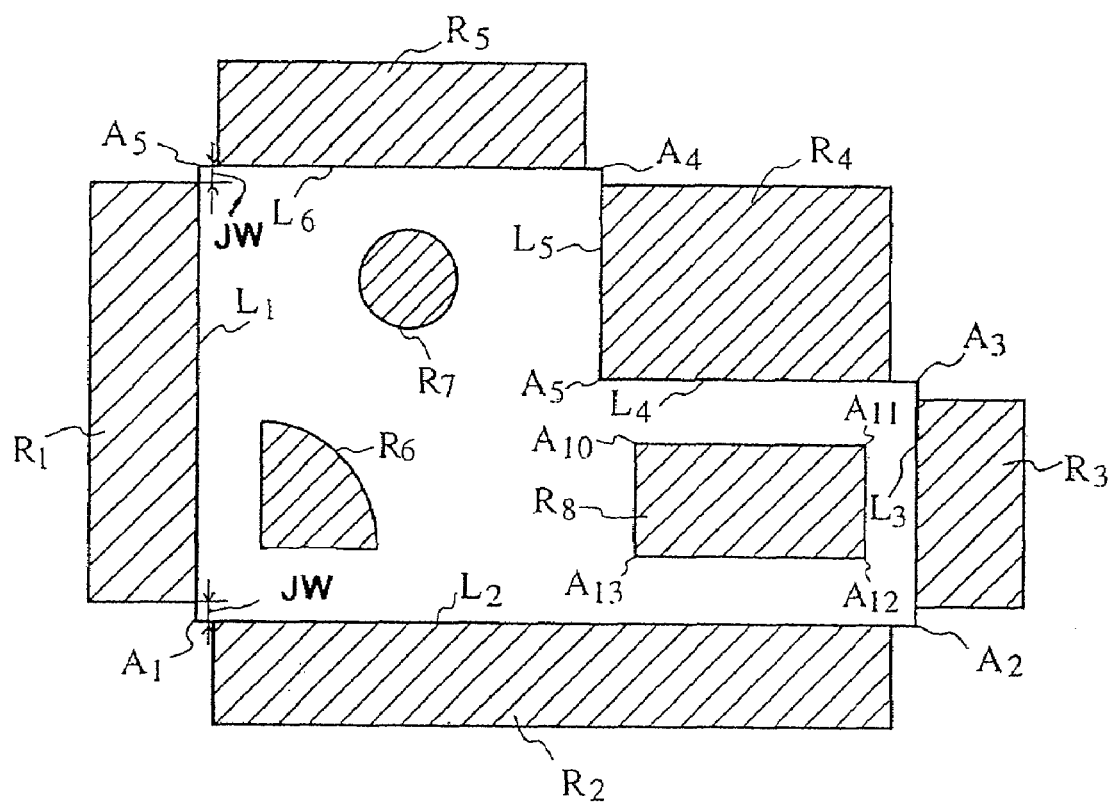

In the processing intention data generator 90, "processing intention data" are generated on the basis of the data from the shape feature data adding section through an operation of the operator. "Processing intention data" are data in a step immediately prior to the preparation of a specified NC program, in which data a tool is not specified. In case of an example in FIGS. 15 and 18, the processing intention data are as follows (see FIG. 19).

1. Region R1:
    Processing intention: straight line allocation (outside cutting),
    Processing pattern: continuously progressing punching,
    Position, range, and progressing direction:
        Continuously progressing punching starting point=a point distant from point A5 toward A1 on the line L1 by a joint width JW,
        Continuously progressing punching end point=a point distant from point A1 toward A5 on the line L1 by a joint width JW,
        Continuously progressing punching width=not less than 5 mm and not more than 10 mm,
    Processing order: after punching of individual holes,
2. Region R2:
    Processing intention: straight line allocation (outside cutting),
    Processing pattern: continuously progressing punching,
    Position, range, and progressing direction:
        Continuously progressing punching starting point=a point distant from point A1 toward A2 on the line L2 by a joint width,
        Continuously progressing punching end point=a point distant from point A2 toward A1 on the line L2 by a joint width,
        Continuously progressing punching width=not less than 5 mm and not more than 10 mm,
    Processing order: after punching of individual holes,
3. Region R3:
    Processing intention: straight line allocation (outside cutting),
    Processing pattern: continuously progressing punching,
    Position, range, and progressing direction:
        Continuously progressing punching starting point=a point distant from point A2 toward A3 on the line L3 by a joint width,
        Continuously progressing punching end point=a point distant from point A3 toward A2 on the line L3 by a joint width,
        Continuously progressing punching width=not less than 5 mm and not more than 10 mm,
    Processing order: after making holes,
4. Region R4:
    Processing intention: L-shaped corner processing,
    Processing pattern: One-way, exhaustive punching-out,
    Position, range, and punching-out direction:
        One-way, exhaustive punching-out starting point=a point having as its x-coordinate the x-coordinate of a point distant from point A3 toward A5 on the corner L (that is formed by lines L4 and L5) by a joint width and having as its y-coordinate the y-coordinate of a point distant from point A4 toward A5 of the corner L by a joint width,
        One-way, exhaustive punching-out end point=a point A5 on the corner L,
        Punching-out direction: direction from point A3 toward A5 on the corner L,
    Processing order: after punching of individual holes,
5. Region R5:
    Processing intention: straight line allocation (outside cutting),
    Processing pattern: continuously progressing punching,
    Position, range, and progressing direction:
        Continuously progressing punching starting point=a point distant from point A4 toward A5 on the line L6 by a joint width,
        Continuously progressing punching end point=a point distant from point A5 toward A4 on the line L6 by a joint width,
        Continuously progressing punching width=not less than 5 mm and not more than 10 mm,
    Processing order: after punching of individual holes,
6. Region R6:
    Processing intention: irregularly-shaped hole,
    Processing pattern: fan-shape single punching,
    Designation of dies: No. 1,
    Position, range, and punching direction:
        Reference position for the single punching=a point 7 on the irregularly-shaped hole,
    Processing order: prior to processing the outside area,
7. Region R7:
    Processing intention: round hole,
    Processing pattern: single punching or rose-shaped exhaustive punching-out by a single tool,
    Position, range, and punching direction:
        Center position=center of the circle of the round hole,
        Range=inside of the circle whose radius is equal to the round hole,
        Punching direction=from center to circumference of the circle,
    Processing order: prior to processing the outside area,
8. Region R8:
    Processing intention: rectangular hole,
    Processing pattern: single punching or one-way exhaustive punching-out or back-and-forth moving exhaustive punching-out,
    Position, range, and punching direction:
        Reference position for single punching=center of the rectangle,
        Area of single punching=inside of the rectangle having points A11 and A13 on the rectangular hole as a pair of opposite corner points,
        Starting point of one-way exhaustive punching-out, or back-and-forth moving exhaustive punching-out=point A11 on the rectangular hole,
        End point of one-way exhaustive punching-out, or back-and-forth moving exhaustive punching-out=point A13 on the rectangular hole,
        Punching direction=from point A11 to A10 on the rectangular hole
    Processing order: prior to processing the outside area As understood from the above description, although a tool is designated by the tool designation from the input section 82 for processing of the region 6, no tool is designated for processing of the other regions.

With the automatically programming apparatus as arranged above, the "processing intention data" which are immediately previous data for making an NC program for manufacturing a product of this shape by means of a punching process and in which tools are almost not specified are generated from a shape data.

The first punch-press numerical controller 54 is provided with an NC program generator 100 provided with a tool data adding section (tool selector) 96 and a processing locus data adding section (a processing locus determiner) 98, in addition to the punch identification information storing section 62, the die identification information storing section 64, the punch-and-die-pair identification information generator 66, and the punch-and-die-pair identification information comparator 68.

More specifically when processing intention data are inputted from the processing intention data generator 90 through the central manager 80, the tool data adding section 96 adds data of proper tools (pair of punch and die) to the processing regions R1 to R6 and R8 in the processing intention data by referring to the information from the punch-and-die-pair identification information generator 66 and to suggestions on the ways of using the tools, stored in advance in the tool data adding section 96 (that is, it selects and assigns proper tools to the respective processing regions R1 to R6 and R8). At that time, it is desirable to select tools mounted on the turrets 22 and 24 of the first punch press 52 as much as possible. And when punching the round hole of R7, it is desirable to select a tool that can punch the hole by a single punching without carrying out a nibbling to obtain a fine finish. Furthermore, in the continuously progressing punching process and the exhaustive punching-out process for R1 to R5 and R8, tools are selected such that their sizes are as large as possible so as to reduce a processing time, and at the same time unbalanced load, which is produced by a final punching operation to cut off a section with very small size, is not occurred. Further, although not illustrated, it is also possible to chose a new tool, with reference to data concerning the frequency of use of each tool and stored in advance, to obtain a fine finishing. On the other hand, it is also possible to use up a frequently used tool by using such tool with priority in order to reduce a man-hour for tool management.

Figure 20A:
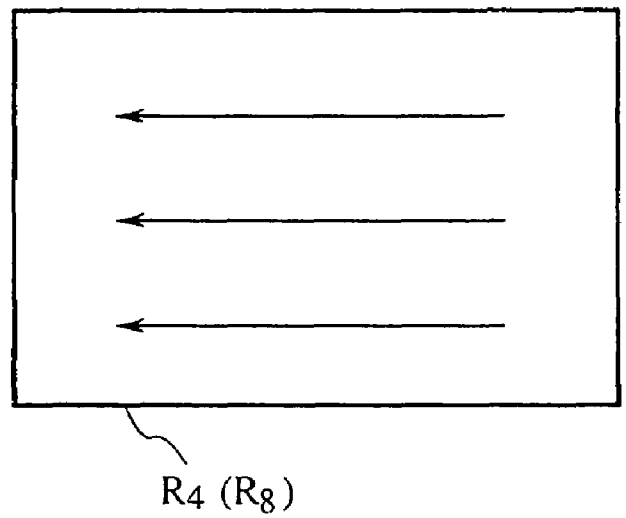
Figure 20B:
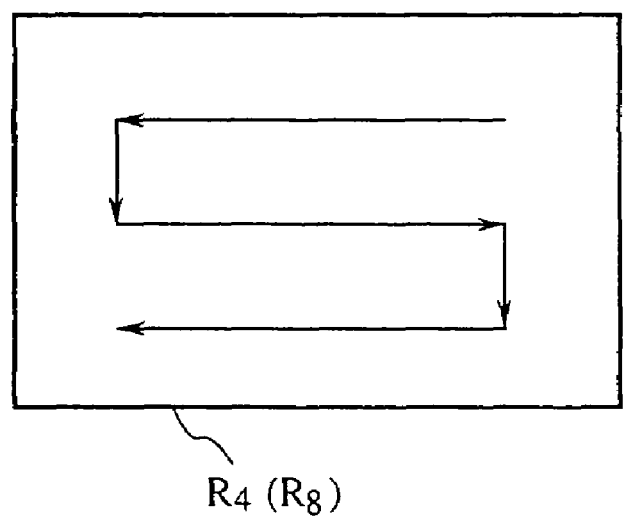

In the processing locus data adding section 98, processing locus data are added by operation of an operator to the data supplied from the tool data adding section (tool selector). The processing locus data are data for specifying a processing locus in case that there are a plurality of processing loci in regions R4, R8, and the like as shown in FIGS. 20A and 20B.

The NC program generator 100 generates eventually an NC program for the first turret punch press on the basis of data in the processing locus data adding section 98.

Figure 21:
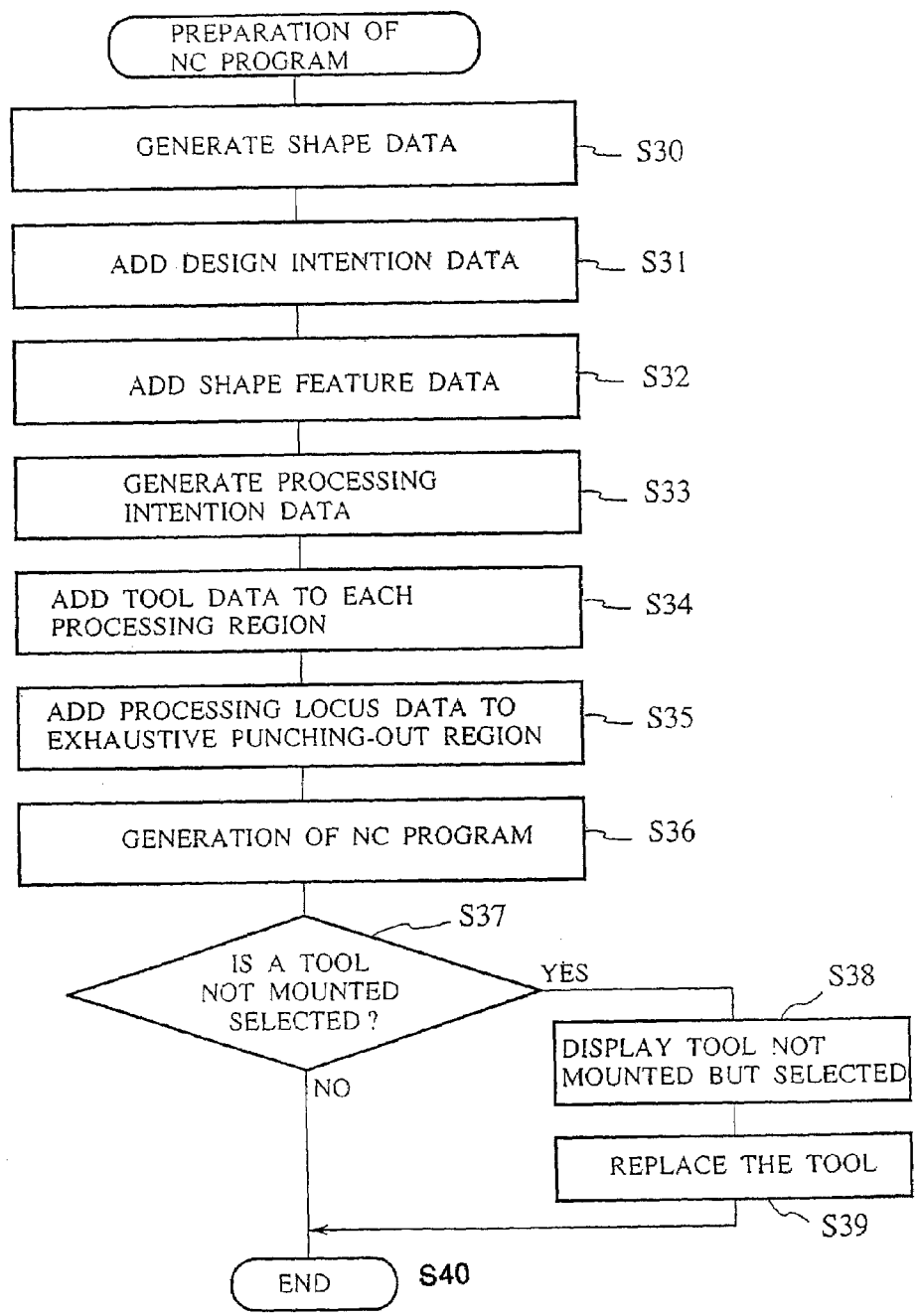
FIG. 21 is a flowchart for showing the operation of the apparatus shown in FIG. 17.

FIG. 21 is a flowchart for explaining a procedure for generating an NC program for the first turret punch press in a turret punch press system provided with the automatically programming apparatus and the punch-press numerical controller of the sec embodiment. That is to say, the system generates shape data in step S30, adds design intention data in step S31, adds shape feature data in step S32, generates processing intention data in step S33, and adds tool data to processing regions R1 to R6 and R8 (that is, it selects and assigns tools to the respective regions R1 to R6 and R8) in step S34. In this step S34, in the same manner as the embodiment shown in FIG. 16, tools that are already mounted on the turrets 22 and 24 of the first turret punch press 52 are selected as much as possible. In case of selecting a tool not mounted on the turret of the first turret punch press 52, the system stores an identification number and the like of the tool.

Then the system adds tool locus data to the exhaustive punching-out region in step S35, and generates an NC program in step S36.

In step S37, the system determines whether at least one tool that is not mounted on the first turret punch press has been selected when the tool data are added in the step S34, and if at least one tool not mounted has been selected, the system goes to step S38. In step S38, the system displays the identification number and the like of the tool that has been selected but not mounted on the first punch press. In step S39, the system searches a place where such tool is stored in the same manner as in steps S7 and S8 in FIG. 16 (information of the place where the tools is stored is stored in advance in the numerical controller 54 or the central manager 80 in the same manner as the steps S1 in FIG. 16), and takes out the tool from the searched place, and then mounts the taken-out tool on the first turret punch press. And in step S40, the system finishes generating the NC program.

In case of "No" in step S37, the system directly goes to step S40 and terminates generating the NC program.

What is claimed is:

1. A method of preparing a program for a punch press, wherein said punch press is provided with a punch supporting member that supports a plurality of punches, a die supporting member that supports a plurality of dies corresponding to said punches and a tool storage device that stores the plurality of punches and the plurality of dies; and identification media to identify each tool are attached respectively on each of said punches and each of said dies;

said punch press is provided with a punch identification medium reader that reads out a punch identification information from a punch identification medium attached to said punch and a die identification medium reader that reads out a die identification information from a die identification medium attached to said die;

wherein said program preparing method prepares said program by feeding a plurality of punch identification information and a plurality of die identification information from said respective identification medium readers back to an automatic programming apparatus and by allotting a plurality of punches existing on said punch supporting member and a plurality of dies existing on said die supporting member to a workplace region to be processed such that a total number of replacements of punches in said punch supporting member and dies in said die supporting member is minimized, said program preparing method comprising:

identifying punches mounted on the punch support member and dies mounted on the die support member;

generating an NC program for the punch press by selecting a punch mounted on the punch support member and a die mounted on the die support member;

identifying a punch and a die stored in the tool storage device and selected in generating the NC program; and generating a program for replacement of the punch and die mounted on the support members with the punch and die stored in the tool storage device and selected in generating the NC program, wherein the NC program is generated by selecting a maximum number of tools currently mounted for use such that tools of the selected maximum number of tools currently mounted will not require replacement.

2. The method of preparing a program for a punch press of claim 1, wherein said program preparing method further maximizes an efficiency.

3. The method of preparing a program for a punch press of claim 2, wherein the maximized efficiency of the program preparing method is determined by minimizing a total number of punch replacements and die replacements offset by maximizing a measure of flatness of a finished surface.

4. The method of preparing a program for a punch press of claim 2, wherein the maximized efficiency of the program preparing method is determined by minimizing a total number of replacements of punches and dies offset by minimizing a tact time.

5. The method of preparing a program for a punch press of claim 2, wherein the maximized efficiency of the program preparing method is determined by minimizing a total number of replacements of punches and dies offset by minimizing the number of punches required to obtain a fine finish.

* * * * *